United States Patent
Hanson et al.

(10) Patent No.: US 9,652,356 B2
(45) Date of Patent: *May 16, 2017

(54) TRACKING PIPELINED ACTIVITY DURING OFF-CORE MEMORY ACCESSES TO EVALUATE THE IMPACT OF PROCESSOR CORE FREQUENCY CHANGES

(71) Applicant: INTERNATIONAL BUSINESS MACHINES CORPORATION, Armonk, NY (US)

(72) Inventors: Heather L. Hanson, Austin, TX (US); Venkat R. Indukuru, Austin, TX (US); Francis P. O'Connell, Austin, TX (US); Karthick Rajamani, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 12 days.

This patent is subject to a terminal disclaimer.

(21) Appl. No.: 14/723,989

(22) Filed: May 28, 2015

(65) Prior Publication Data

US 2016/0041775 A1 Feb. 11, 2016

Related U.S. Application Data

(63) Continuation of application No. 14/456,198, filed on Aug. 11, 2014.

(51) Int. Cl.
*G06F 1/32* (2006.01)
*G06F 1/00* (2006.01)
*G06F 11/34* (2006.01)

(52) U.S. Cl.
CPC .......... *G06F 11/3466* (2013.01); *G06F 1/324* (2013.01); *G06F 1/3206* (2013.01);
(Continued)

(58) Field of Classification Search
CPC .................................................... G06F 1/3203
(Continued)

(56) References Cited

U.S. PATENT DOCUMENTS 8,250,395 B2 8/2012 Carter et al.
8,261,112 B2 9/2012 Carter et al.
(Continued)

OTHER PUBLICATIONS

Non-final Office Action, mailing date Jun. 27, 2016, U.S. Appl. No. 14/456,198, filed Aug. 11, 2014, In re Hanson.
(Continued)

*Primary Examiner* — Suresh Suryawanshi
(74) *Attorney, Agent, or Firm* — Steven L. Bennett; Amy J. Pattillo

(57) ABSTRACT

A processor system tracks, in at least one counter, a number of cycles in which at least one execution unit of at least one processor core is idle and at least one thread of the at least one processor core is waiting on at least one off-core memory access during run-time of the at least one processor core during an interval comprising multiple cycles. The processor system evaluates an expected performance impact of a frequency change within the at least one processor core based on the current run-time conditions for executing at least one operation tracked in the at least one counter during the interval.

12 Claims, 6 Drawing Sheets

(52) U.S. Cl.
CPC ........ *G06F 1/3243* (2013.01); *Y02B 60/1217* (2013.01); *Y02B 60/1239* (2013.01)

(58) Field of Classification Search
USPC ........................................................ 713/320
See application file for complete search history.

(56) References Cited

U.S. PATENT DOCUMENTS

| | | | |
|---|---|---|---|
| 8,327,176 B2 | 12/2012 | Accapadi | |
| 8,370,665 B2 | 2/2013 | Gargash et al. | |
| 9,218,044 B2* | 12/2015 | Brock | G06F 1/3237 |
| 2008/0244239 A1 | 10/2008 | DeWitt | |
| 2008/0271043 A1 | 10/2008 | Kim et al. | |
| 2009/0049314 A1 | 2/2009 | Taha et al. | |
| 2011/0047401 A1 | 2/2011 | Werner et al. | |
| 2011/0088041 A1 | 4/2011 | Alameldeen et al. | |
| 2011/0093734 A1 | 4/2011 | Burchard et al. | |
| 2011/0302372 A1 | 12/2011 | Fontenot | |
| 2012/0260057 A1 | 10/2012 | Eyerman et al. | |
| 2014/0053164 A1 | 2/2014 | Bishop | |
| 2014/0229720 A1* | 8/2014 | Hickey | G06F 1/324 712/240 |
| 2015/0094987 A1 | 4/2015 | Tene | |
| 2016/0041594 A1 | 2/2016 | Hanson | |

OTHER PUBLICATIONS

IBM Powers microprocessor, Floyd, et al., IBM Journal of Research and Development, Nov. 2007, vol. 51 Issue: 6, pp. 733-746. ISSN: 0018-8646, Digital Object Identifier: 10.1147/rd.516.07332.

Deng, et al, "CoScale: Coordinating CPU and Memory Ssystem DVFS in Server Systems", accessed online from <http://www.cs.rutgers.edu/~ricardob/papers/micro12.pdf> as of Jul. 28, 2014, 12 pages.

U.S. Appl. No. 14/456,198, filed Aug. 22, 2014, In re Hanson, 47 pages.

Final Office Action, mailing date Oct. 4, 2016, U.S. Appl. No. 14/456,198, filed Aug. 11, 2014, In re Hanson.

Final Office Action, mailing date Nov. 4, 2016, U.S. Appl. No. 14/456,198, filed Aug. 11, 2014, In re Hanson.

* cited by examiner

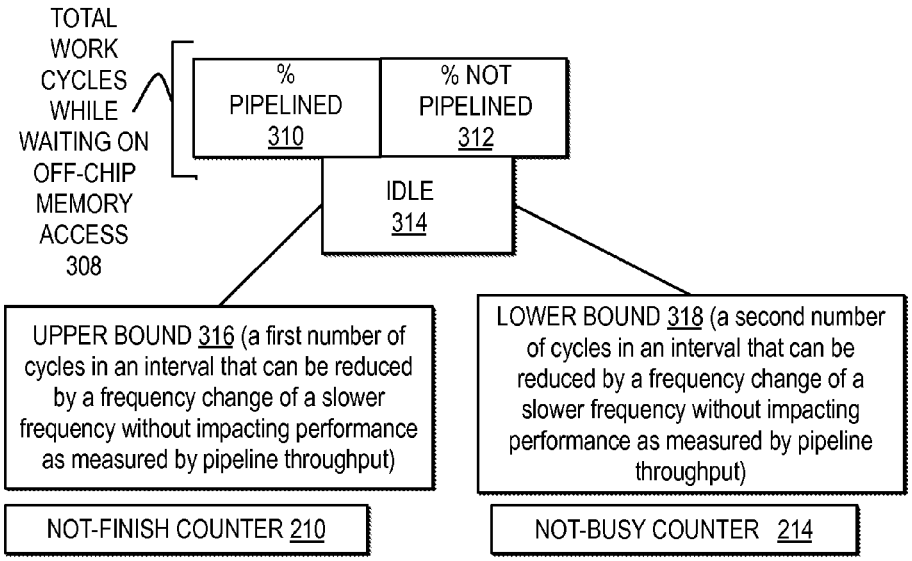

FIG. 3

NOT-FINISH COUNTER 210

```
FrequencySensitivityFinish <= gate_and (
/*NOR of all 10 execution units' finish signals*/
not gate_or (multiple execution unit finish signals), /* OR of all 8 threads L3 miss signals */
gate_or(multiple L3 miss signals))                                    402
```

NOT-BUSY COUNTER 214

```
FrequencySensitivityBusy <= gate_and (
(/*NOR of single-cycle units' finish signal and multi-cycle busy signal; busy signals are delayed by
one cycle (_d1) to time-align with finish signal*/
not gate_or (multiple single-cycle unit finish signals, multiple multi-cycle unit busy signals delayed by one
cycle), /* OR of all 8 threads L3 miss signals */
gate_or(multiple L3 miss signals))                                    404
```

FIG. 4

TRACKING PIPELINED ACTIVITY DURING OFF-CORE MEMORY ACCESSES TO EVALUATE THE IMPACT OF PROCESSOR CORE FREQUENCY CHANGES

CROSS REFERENCE TO RELATED APPLICATIONS

This application is a continuation of commonly assigned U.S. patent application Ser. No. 14/456,198, filed Aug. 11, 2014, which is hereby incorporated herein by reference.

BACKGROUND

1. Technical Field

This invention relates in general to managing processor core performance and more particularly to tracking pipelined activity during off-core memory accesses to evaluate the actual impact of a frequency change on one or more processor cores.

2. Description of the Related Art

Power issues and thermal issues are design constraints for high-performance computer systems. Energy consumption and heat dissipation within a high-performance computer system impacts the potential performance gains that could be achieved from other design improvements such as increasing transistor densities and increasing clock speeds.

To minimize energy consumption while maintaining high performance, a power performance controller may be designed into a high-performance computer system to control running system components at lower power states, without impacting performance. Dynamic Voltage and Frequency Scaling (DVFS) is a common technique for managing power in a high-performance computer system. DVFS allows for adjusting the core frequency at which processors are running to reduce the power state of the components.

In a computer system, workloads include compute-bound workloads that are progressing within a processor core and memory-bound workloads that are waiting for memory accesses to off-core memory. In general, computer system performance tracks linearly with processor core frequency for workloads that are compute-bound, and therefore limited by CPU speed, and is nearly independent of processor core frequency for workloads that are memory-bound, and therefore limited by memory bandwidth and latency, which are unrelated to CPU speed. Within a high-performance computer system implementing processors that allow multiple workloads to execute simultaneously, however, the actual working relationship between frequency, and the resulting performance, is variable, rather than linear.

BRIEF SUMMARY

Within a high-performance computer system implementing processors that allow multiple workloads to execute simultaneously, evaluating the actual impact of a frequency change on the performance of the processors based on the conditions at run-time is necessary to select an appropriate frequency level. In view of the foregoing, there is a need for a method, system, and computer program product for tracking the real-time performance of processor cores and evaluating the actual impact of a frequency change on the performance of a high-performance computer system to select a frequency level. Tracking real-time performance of processor cores includes tracking pipelined activity during off-core memory accesses, which provides an indicator for the expected performance impact of frequency changes for current run-time conditions.

In one embodiment, a method for tracking pipelined activity during off-core memory accesses comprises tracking, in at least one counter, a number of cycles in which at least one execution unit of at least one processor core is idle and at least one thread of the at least one processor core is waiting on at least one off-core memory access during run-time of the at least one processor core during an interval comprising a plurality of cycles by tracking the number of cycles on at least one multi-cycle execution unit from among the at least one execution unit that requires more than one cycle to complete execution of at least one operation. The method comprises evaluating an expected performance impact of a frequency change within the at least one processor core based on the current run-time conditions tracked in the at least one counter during the interval.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 3 is a block diagram illustrating one example of the types of work cycles that may be identified during runtime of a processor core that provides pipelining of multiple workloads and off-core memory accesses;

FIG. 4 is a block diagram illustrating one example of each of the not-finish counter and the not-busy counter of the frequency sensitivity counters specified in hardware description language;

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
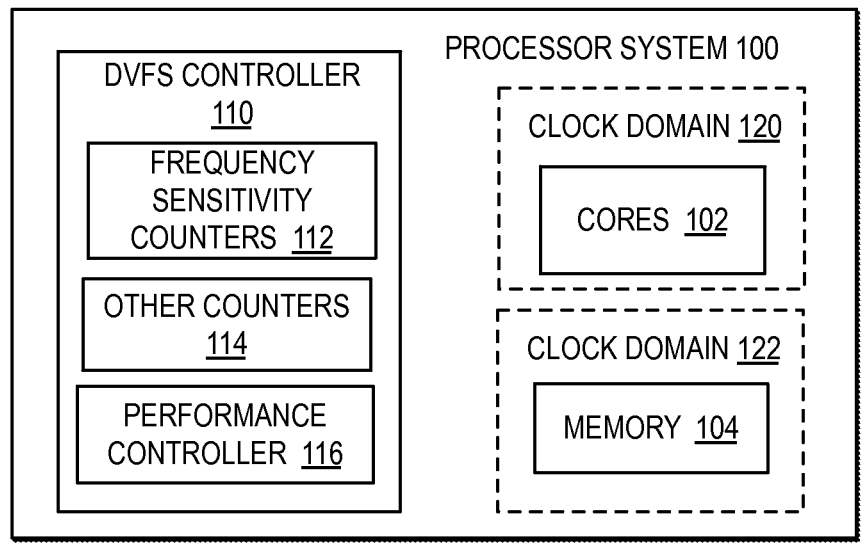
FIG. 1 is a block diagram illustrating one example of a processor system including multiple processor cores enabled to simultaneously handle multiple workloads, at least one frequency sensitivity counter for tracking pipelined activity during off-core memory accesses, and a dynamic voltage and frequency scaling (DVFS) controller for controlling frequency selection based on the tracked pipelined activity during off-core memory accesses.

With reference now to FIG. 1, a block diagram illustrates one example of a processor system including multiple processor cores enabled to simultaneously handle multiple workloads, at least one frequency sensitivity counter for tracking pipelined activity during off-core memory accesses, and a dynamic voltage and frequency scaling (DVFS) controller for controlling frequency selection based on the tracked pipelined activity during off-core memory accesses.

In one example, a processor system 100, which may represent a high performance computer system, or may be a component of a high performance computer system, may include one or more cores 102. Each processor core within cores 102 may include one or more processor cores, each with one or more layers of cache. In one example, each core with one or more layers of cache may be referred to as a central processing units (CPU). Cores 102 may be embedded on one or more processor chips or one or more systems on chip, each containing one or more processor cores.

In one example, cores 102 may include one or more layers of cache on chip with each of the one or more processor cores, and may also access one or more types of memory of processor system 100, such as memory 104. In one example, cores 102 and memory 104 may operate in different clock domains. In one example, cores 102 operate in a clock domain 120 and memory 104 operates in a clock domain 122. In one example, clock domain 120 and clock domain 122 each represent a frequency at which elements are set to operate and may be set to a same frequency or different frequencies. In one example, memory 104 represents memory that is not part of a particular processor core within cores 102, and may be referred to as off-core memory. In another example, memory 104 may be part of a particular processor core, but not tied to clock domain 120. In one example, access to memory 104 may be shared by cores 102. While in the example cores 102 are illustrated operating with one clock domain 120, in another embodiment, each processor core within cores 102 may operate within a separate clock domain. In addition, while in the example memory 104 is illustrated operating within one clock domain 122, memory 104 may represent multiple memory components and one or more of those components may operate within multiple independent clock domains.

In the example, processor system 100 may also include a DVFS controller 110. In the example, DVFS controller 110 provides a controller for controlling dynamic voltage and frequency scaling for one or more processor cores enabled to simultaneously handle multiple workloads, such as one or more SMT processor core, within CPUs 102. SMT represents the ability of a single physical processor core to simultaneously execute instructions from more than one hardware thread context, such that the processor core is enabled to read and run instructions in parallel and multiple applications can be scheduled at the same time on the same processor core. The example of a data processing environment illustrated in FIG. 1 is provided as an illustrative embodiment in which the present invention may be implemented, however, one of ordinary skill in the art will appreciate that FIG. 1 is not intended to assert or imply any limitation with regard to the environments in which aspects or embodiments of the present invention may be implemented. Many modifications to the depicted environments may be made without departing from the spirit and scope of the present invention.

In the example, DVFS controller 110 includes a performance controller 116 for adjusting frequency and voltage applied by one or more frequency and power controllers at run-time, in view of the metrics tracked by one or more counters, to optimize the performance and power consumption of cores 102 within a computer system 100. In one example, DVFS controller 110 manages adjustments to frequency and voltage at run-time to allow the performance and power consumption of computer system 100 to be tuned to meet power budgets and performance targets and thresholds set for computer system 100. In one example, performance controller 116 is illustrated as a component that may include, but is not limited to, one or more of dynamically programmable hardware logic within DVFS 110, software or a combination of hardware logic and software of DVFS controller 110, and an interface for connecting with a service or other system for performing performance management accessed by DVFS controller 110.

In one example, for performance controller 116 to select an appropriate frequency level, DVFS controller 110 first tracks real-time data that estimates current performance sensitivity to frequency changes on the performance of cores 102. In one example, DVFS controller 110 tracks real-time data that provides indicators of the expected performance impact that a frequency change would have on performance of cores 102 by detecting indicators of slack within the computer system. In one example, slack refers to any property that allows a computer system to run some portion of itself at a lower power operating state while still achieving specified performance goals. In one example, DVFS controller 110 monitors cores 102 to detect underutilization by any one or more processor core within cores 102 as an indication to exploit slack by lowering frequency for cores 102.

In the example, workloads that are compute-bound, within cores 102, are limited by the CPU speeds of cores 102 and workloads that are memory-bound, from cores 102 to memory 104, are limited by memory bandwidth and latency, which is unrelated to the CPU speed of cores 102. In general, if cores 102 are handling only a single workload, performance tracks linearly with processor frequency of clock domain 120 for workloads that are compute-bound within cores 102 and is nearly independent of processor frequency of clock domain 120 for workloads that are memory-bound to memory, such as memory 104. In contrast to an example where cores 102 are handling only a single workload, when multiple workloads execute simultaneously within one or more of cores 102, and may include one or more workloads that are compute-bound and one or more workloads that are memory-bound, the relationship between frequency and performance is variable. In the example, DVFS controller 110 may include frequency sensitivity counters 112 and one or more other counters 114, implemented to indicators of the operational relationship between frequency and performance at run-time within cores 102, which may include multiple workloads executing simultaneously, and may include workloads that are compute-bound and workloads that are memory-bound.

In one example, during the cycles that cores 102 are waiting on the result of one or more off-core memory access requests to memory 104, because multiple threads may be executing at the same time, cores 102 may or may not be working while waiting on the result of the one or more off-core memory access requests. In one example, while a processor core is waiting on the result of one or more off-core memory access requests to memory 104, if the processor core is not executing an operation of any other execution threads, the processor core is idle. In addition, in one example, while a processor core is waiting on the result of one or more off-core memory access requests to memory 104, if the processor core is executing an operation of any other execution threads, the processor core may be doing work if the processor core is finishing an execution thread during a cycle, however, if the processor core is not finishing an execution thread during a cycle, the processor core is considered idle and not working.

In the example, during cycles where the processor core is both idle and waiting on an off-core memory access request, there is slack within the computer system and frequency reductions could be performed during these cycles that would not have impact on performance. In the example, to count the cycles during which a processor core within cores 102 is both idle and waiting on an off-core memory access request, in order to exploit the slack during the cycles, DVFS controller 110 includes frequency sensitivity counters 112, which track the extent of pipeline activity occurring during off-core memory access, at run-time, to provide a hardware mechanism indicating the expected performance impact of a frequency change for the current run-time conditions within cores 102. The values tracked by frequency sensitivity counters 112 provide a hardware mechanism for indicating an accurate performance sensitivity to frequency of cores 102 at run-time. Using the values in frequency sensitivity counters 112, collected over a single interval or compared over multiple intervals, performance controller 116 may evaluate frequency sensitivity and change the frequency values selected for computer system 100 to optimize performance and per watt metrics, leading to improved benchmark and energy certification workload scores. In one example, energy certification workload scores include, but are not limited to, ENERGY STAR certification workload scores and other energy efficiency rating systems.

In the example, DVFS controller 110 may also include other counters 114. In one example, other counters 114 may count additional or alternate data that tracks other indicators of frequency sensitivity or tracks other data related to performance. In one example, other counters 114 may include counters that track an estimate of a number of cycles spent waiting for off-core memory accesses to enable indirectly inferring frequency sensitivity. For example, other counters 114 may track an estimate of a number of cycles spent within clock domain 120 and an estimate of a number of cycles spent outside of clock domain 120. In one example, to track an estimate of the number of cycles spent within clock domain 120 and an estimate of a number of cycles spent outside of clock domain 120, other counter 114 may access a list of programmable values set to constants, where when an off-core memory access is detected, the constants are added to other counters 114 to track an estimate the number of cycles spent within clock domain 120 and to track an estimate of a number of cycles spent outside clock domain 120. The programmable values set to constants may include estimates of fetch latencies and other delays, however, the actual run-time metrics may not match the pre-set constants. In contrast to estimating a number of cycles spent waiting for off-core memory accesses in other counters 114 based on programmed constants, frequency sensitivity counters 112 track real-time indicators at run-time of a number of cycles during which the processor core is idle and waiting for off-core memory accesses. In another example, other counters 114 may include other counters to count the number of cycles for a specific combination of events during which performance bottlenecks are likely to be related to off-core memory accesses in the completion stage of the pipeline, such as instruction cache accesses and data cache accesses, to estimate the number of cycles a processor core pipeline is stalled waiting on at least one off-core memory access. In contrast to estimating a number cycles during which the core pipeline is stalled waiting for off-core memory accesses based on a specific combination of events, where an off-core memory access may or may not actually occur during the specific combination of events, frequency sensitivity counters 112 tracks, in real-time, the number of cycles during which the processor is both idle and waiting on at least one off-core memory access. In other embodiments, DVFS controller 110 may only include frequency sensitivity counters 112 and not include other counters 114.

In the example, while other counters 114 may be included, frequency sensitivity counters 112 provide values that accurately track performance sensitivity, using only one or two counters, which only requires silicon area per core for one or two counters. In addition, frequency sensitivity counters 112 do not require programmable elements or mode bits, and therefore require minimal verification work.

In one example, a separate instance of DVFS controller 110 or of one or more components of DVFS controller 110, including frequency sensitivity counters 112, other counters 114, and performance controller 116, may be implemented for each core within cores 102, and the separate instances may be integrated within one or more cores of cores 102 or may be integrated on a chip with one or more cores of cores 102. In another example, a single instance of DVFS controller 110 may monitor and manage frequency control for cores 102.

Figure 2:
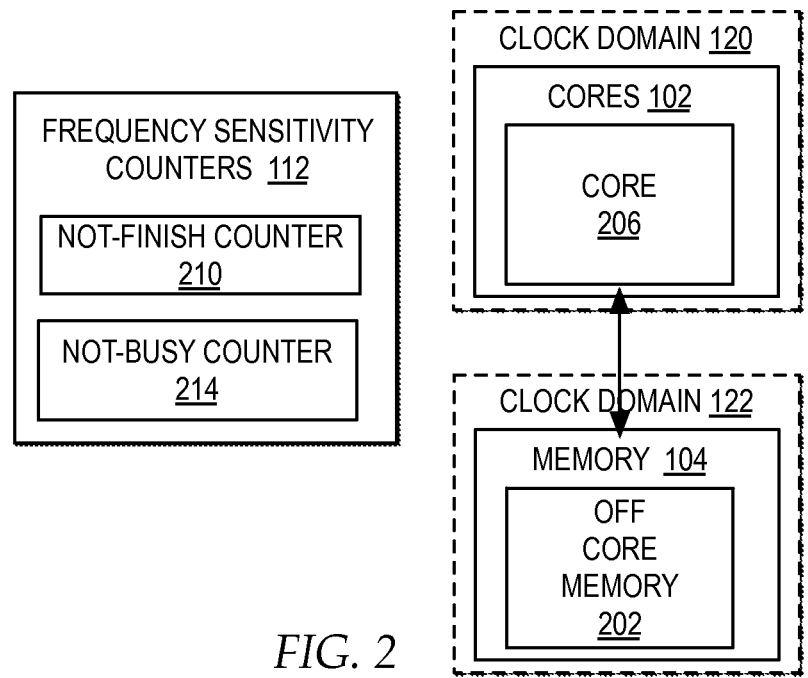
FIG. 2 is a block diagram illustrating one example of frequency sensitivity counters for tracking pipelined activity during off-core memory accesses for directly inferring frequency sensitivity in real-time.

FIG. 2 illustrates a block diagram of frequency sensitivity counters for tracking pipelined activity during off-core memory accesses for directly inferring frequency sensitivity in real-time.

In one example, a core 206, which may represent a processor core, from among cores 102, operates under clock domain 120. Core 206 may perform off-core memory accesses, such as to off-core memory 202, operating under clock domain 122 of memory 104.

In the example, frequency sensitivity counters 112 may include a set of two counters with complimentary views of performance sensitivity to frequency changes. Each of the counters in frequency sensitivity counters 112 may track a separate idleness indicator for cycles in which execution units of core 206 are both idle and waiting on an off-core memory access to one or more off-core memories, such as off-core memory 202. In one example, one indicator that core 206 is waiting on an off-core memory access to off-core memory 202 is detected from a signal indicating that at least one data miss to the lowest level of cache dedicated to core 206 is pending, which indicates that the cache on core 206 does not include the requested data for a workload memory request and that core 206 has sent a memory access request to off-core memory 202. In one example, the signal indicating that at least one data miss to the lowest level of cache dedicated to core 206 is pending may be referred to as a pending L3 data miss, where L3 cache is the lowest level of cache dedicated to core 206. In other examples, other types of signals may be detected that indicate that processor core 206 is waiting on an off-core memory access to off-core memory 202.

In one example, each of the counters within frequency sensitivity counters 112 may track different metrics for idleness. In particular, frequency sensitivity counters 112 tracks different metrics indicating whether work is happening on the core during the time with the core is also waiting on an off-core access to off-core memory 202 in order to detect the cycles in which the core is idle while waiting on an off-core memory access to off-core memory 202, during which the frequency may be reduced without impacting performance. In one example, frequency sensitivity counters 112 includes a not-finish counter 210 that tracks a metric for idleness indicating whether operations in progress are finishing execution and a not-busy counter 214 tracks a metric for idleness by tracking cycles that where the core is not busy. In one example, not-finish counter 210 and not-busy counter 214 may have similar counter values when the instruction mix is dominated by operations that execute in a single cycle and may have different counter values for multi-cycle operations.

In one example, combining not-finish counter 210 and not-busy counter 214 provides a comprehensive view of frequency sensitivity, based on real-time metrics, when the pipeline is operating at less than full capacity. In one example, the difference between not-finish counter 210 and not-busy counter 214 may indicate the number of cycles during which at least one execution unit is busy, but none of the operations in progress are finishing.

When not-finish counter 210 and not-busy counter 214 are accumulated over millions of cycles, the values in not-finish counter 210 and not-busy counter 214 reflect trends in pipeline activity during the time when off-core memory accesses occur, which can be used to manage frequency to optimize power and performance. In one example, the length of the interval over which values are accumulated in not-finish counter 210 and not-busy counter 214 may be preselected or dynamically adjusted by DVFS controller 110.

In one example, frequency sensitivity may be directly inferred from the degree of difference between not-finish counter 210 and not-busy counter 214 during a particular interval. In one example, the difference between not-finish counter 210 and not-busy counter 214 may indicate of the extent of pipelining, or overlap, in multi-cycle operations and may indicate the extent of dependency between executions of different units. In particular, in one example, a scale may be set that identifies the extent of pipelining in multi-cycle operations based on the difference between not-finish counter 210 and not-busy counter 214.

In another example, the difference between not-finish counter 210 and not-busy counter 214 as accumulated during a single interval may provide one measurement indicative of the extent of pipelining, which may be considered with other measurements to determine the expected performance impact of a frequency change. In particular, when a same workload is run at different intervals, there may not be a change in the number of multi-cycle execution units used during each interval. In contrast, if different workloads are run at different intervals, the difference between not-finish counter 210 and not-busy counter 214 is impacted by both the extent of pipelining in multi-cycle execution usage and the extent of multi-cycle execution unit usage, such that the difference between not-finish counter 210 and not-busy counter 214 alone may not reference into a scale that identifies the extent of pipelining based on the difference. Therefore, the difference in not-finish counter 210 and not-busy counter 214 may provide one measurement indicating the extent of pipelining overlap, which may be considered in view of additional measurements to determine frequency sensitivity.

In addition, in one example, a measurement indicative of the extent of pipeline overlap may be determined from a comparison of the differences between not-finish counter 210 and not-busy counter 214 as accumulated during different intervals of time, where a same workload is run during each interval. In one example, performance controller 116 may determine this measurement. The differences between the difference in values in each of not-finish counter 210 and not-busy counter 214 accumulated during each of the intervals may indicate the differences in the extent of pipelining overlap, while waiting on an off-core memory access, and differences in the extent of multi-cycle operations occurring during each of the runs. In addition, the differences between the values in not-busy counter 214 alone, accumulated during each of the intervals, may indicate the differences in the extent of pipelining overlap, while waiting on off-core memory accesses, occurring during each of the runs. Further, the differences between the values in not-finish counter 210 alone, accumulated during each for the intervals, may indicate the differences in the extent of pipelining overlap, while waiting on off-core memory accesses, occurring during each of the runs.

In addition, in one example, frequency sensitivity may be directly inferred from a comparison of one or both of not-finish counter 210 or not-busy counter 214 separately, or the difference between not-finish counter 210 and not-busy counter 214, as accumulated during different intervals of time, where a same workload is run during each interval, and where the workloads are run at different frequencies in different intervals. In one example, when a workload is run at a first frequency during a first interval and then run at a second, reduced frequency during a second interval, if the difference in idleness indicated by values in not-busy counter 214 tracked across different frequencies in different intervals are minimal, this may indicate that the frequency sensitivity is not changing in response to the applied frequency change. In one example, the difference in idleness indicated by values in not-busy counter 214 may be considered minimal or not minimal based on one or more types of measurements including, but not limited to, the not-busy counter increment per cycle of processor frequency. In one example, a ratio of the not-busy counter value to processor frequency or not-busy counter value to total number of cycles, may be calculated. If the frequency sensitivity is not changing in response to the applied frequency change, the lack of change may indicate that an additional frequency reduction of similar magnitude could be applied for similar performance trade-offs. In contrast, if the difference in idleness indicated by values in not-busy counter 214 tracked across different frequencies in different intervals is significant, this may indicate a greater sensitivity to frequency change at the second, reduced frequency, which indicates that any additional frequency reduction for the workload would have a greater impact on performance.

In one example, a separate instance of frequency sensitivity counter 112 is specified for each core. For example, not-finish counter 210 and not-busy counter 214 are specified for monitoring core 206. In another example, each instance of frequency sensitivity counters 112 may be specified for multiple cores.

FIG. 3 illustrates a block diagram illustrating one example of the types of work cycles that may be identified during runtime of a processor core that provides pipelining of multiple workloads and off-core memory accesses.

In one example, within the work cycles that run within computer system while a core is waiting on an off-core memory access, as illustrated at reference numeral 308, a percentage of the work cycles are pipelined, as illustrated at reference numeral 310 and a percentage of the work cycles are not pipelined, as illustrated at reference numeral 312. Within the percentage of work cycles that are pipelined and the percentage of work cycles that are not pipelined, there are cycles that may be identified as "idle" cycles 314 where the core is not working while it is waiting on an off-core memory access. In one example, idle cycles 314 may include cycles where the core is not working while waiting on an off-core memory access because there are no operations in progress during these cycles. In another example, idle cycles 314 may include cycles where the core is not working while waiting on an off-core memory access because there are operations in progress but none of the operations are finishing. During idle cycles 314, the frequency of clock domain 120 may be reduced without performance degradation. In one example, performance degradation may include a reduction of the pipeline throughput, where pipeline throughput is the number of instructions that are completed in a pipeline over an interval of time.

Of the cycles identified as idle cycles 314, idleness metrics of the idle cycles may be counted to indicate, from among the total number of cycles a processor core is waiting on an off-core memory access, an upper bound, as illustrated at reference numeral 316, and to indicate a lower bound, as illustrated at reference numeral 318. In one example, upper bound 316 represents an upper bound on slack, where upper bound 316 indicates a first number of cycles in an interval that can be reduced by a frequency change of a slower frequency without impacting performance as measured by the pipeline throughput. In one example, upper bound 316 is calculated from the value in not-finish counter 210. In one example, lower bound 318 is a lower bound on slack, where lower bound 318 indicates a second number of cycles in an interval that can be reduced by a frequency change of a slower frequency without impact performance as measured by the pipeline throughput. In one example, lower bound 318 is calculated from the value in not-busy counter.

In the example, the difference between upper bound 316 and lower bound 318 may also provide an indicator of the amount of pipelining occurring during off-core memory accesses. A smaller difference between upper bound 316 and lower bound 318, may indicate that more pipelining is occurring during the idle cycles that are counted when there are operations in progress but none of the operations are finishing. A larger difference between upper bound 316 and lower bound 318, may indicate that less pipelining is occurring during the idle cycles that are counted when there are operations in progress but none of the operations are finishing.

In the example, in addition to upper bound 316 indicating the a first number of cycles in an interval that can be reduced by a frequency change of a slower frequency without impacting performance and lower bound 318 indicating a second number of cycles in an interval that can be reduced by a frequency change of a slower frequency without impacting performance, the difference between upper bound 316 and lower bound 318 may provide an indicator of the number of cycles during which operations were in progress on at least one execution unit, but none of the execution units was finishing.

FIG. 4 illustrates one example of each of the not-finish counter and the not-busy counter of the frequency sensitivity counters specified in hardware description language.

In one example, at least one processor core may include ten execution units, where a portion of the execution units are single-cycle units and a portion of the execution units are multiple-cycle units. Each execution unit may output a finish signal when the unit finishes executing all the instructions for an operation. Each execution unit may output a busy signal when executing at least one instruction for at least one operation during a particular cycle. In the example, at least one processor core may support multiple threads, where each thread may output an L3 miss signal if the L3 cache cannot fulfill a memory request, where the L3 miss signal indicates that the thread is waiting on an off-core memory access.

In one example, not-finish counter 210 is defined by hardware description language 402. In one example, single-cycle units and multiple-cycle units may each output a finish signal indicating when each unit finishes executing an operation. Hardware description language 402 defines a counter value "FrequencySensitivityFinish" based on the logical AND operation ("gate_and") of a logical not-OR (NOR) ("not gate_or") of all the execution unit finish signals. In the example, "FrequencySensitivityFinish" is "on" for any cycle in which any of the L3 miss signals of the eight threads is on, indicating that a thread is waiting on an off-core memory access, and if none of the execution units has finished execution of an operation. Those of ordinary skill in the art will appreciate that in other examples, additional or alternate numbers of execution unit finish signals may be NOR'd together and that additional or alternate numbers of L3 miss signal threads may be OR'd together. In addition, those of ordinary skill in the art will appreciate that in other examples, additional or alternate signals output by an execution unit may be included in the group of signals NOR'd together to determine whether there is any execution unit that is working and that reducing the frequency while the execution unit is working would impact performance, whether through a signal indicating the execution of an operation is finishing or another signal that indicates an execution unit is not idle.

In one example, not-busy counter 214 is defined by hardware description language 404. In one example, a single-cycle unit may output one or more of a busy signal, indicating the single-cycle unit is busy handling an operation, and a finish signal, indicating the single-cycle unit has finished executing an operation. In one example, a multi-cycle unit may have a busy signal, indicating the multi-cycle unit is busy handling an operation during multiple cycles, and a finish signal, indicating the multi-cycle unit has finished executing an operation. In one example, the finish signals may be set after a an execution unit completes work, such that a finish signal output by an execution unit may be delayed by a cycle after the execution unit was busy.

In particular, in the example illustrated in FIG. 4, the single-cycle units only output finish signals, therefore to align the single-cycle finish signals with the multiple-cycle busy signals, the multiple-cycle busy signals are delayed by one cycle. In another example, if the single-cycle units output busy signals, then the busy signals of every execution unit may be OR'd together.

In particular, in the example, hardware description language 404 defines a counter value "FrequencySensitivityBusy" based on the logical AND operation ("gate_and") of a logical NOR ("not gate_or") of the finish signals of the single-cycle units and the busy signals, delayed by one cycle, of the multi-cycle units with a logical OR ("gate_or") of the L3 miss signals of all the threads. In the example, the busy signals of the multi-cycle units are delayed by one cycle to time align with the finish signals of the single-cycle units. In the example, "FrequencySensitivityBusy" is "on" for any cycle in which any of the L3 miss signals of the eight threads is on, indicating that a thread is waiting on an off-core memory access, and if none of the single execution units is finishing and none of the multi-cycle units, delayed by one cycle, is busy, indicating that there is no operation is progress. Those of ordinary skill in the art will appreciate that in other examples, additional or alternate numbers of finish signals and busy signals may be included in the group of signals NOR'd together to determine whether there is any execution unit that is busy during a cycle and that reducing the frequency while the execution unit is busy would impact performance through any signal that indicates when an execution unit is not handling any instructions of any operation, and therefore is not busy.

Figure 5:
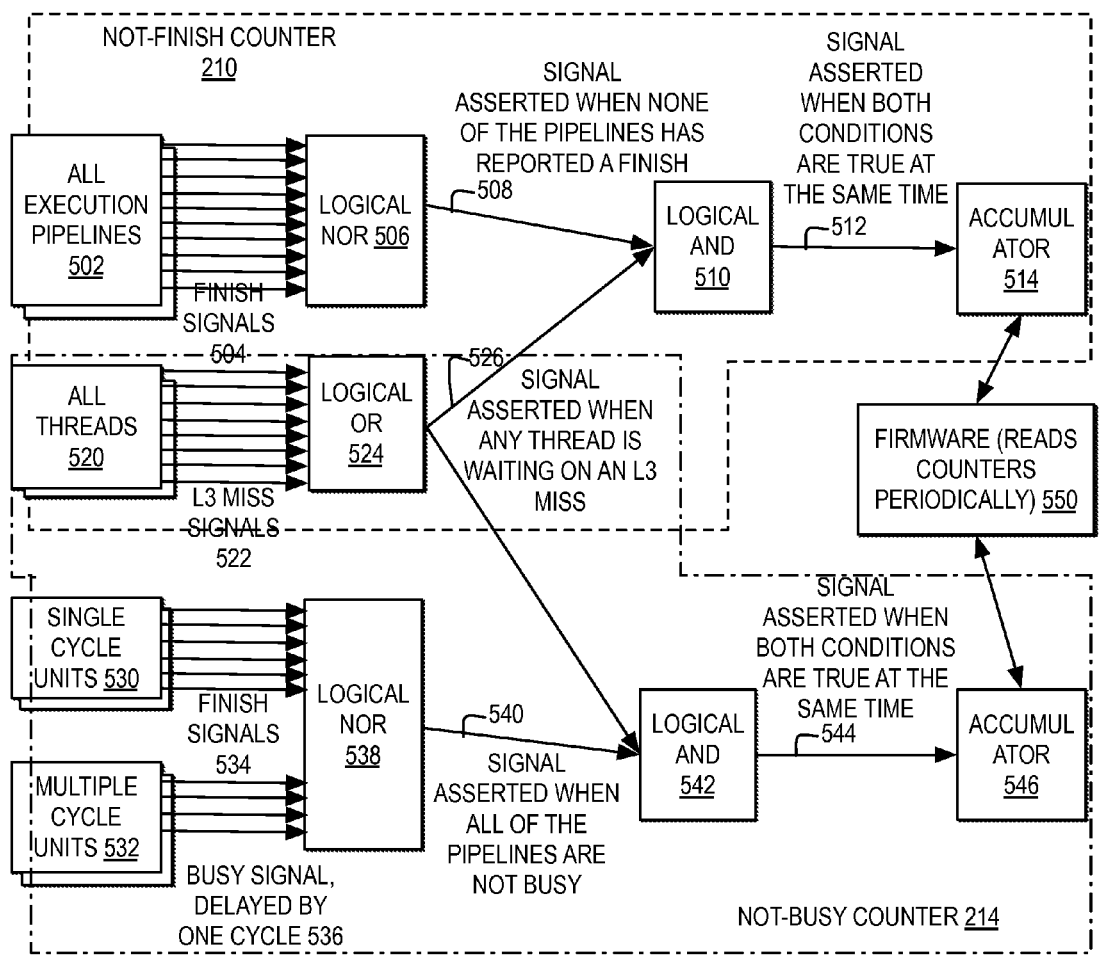
FIG. 5 is a block diagram illustrating one example of the activity within at least one processor core counted by two counters to determine the potential sensitivity of a processor core to frequency changes based on the amount of pipelined activity occurring during off-core memory accesses.

FIG. 5 illustrates a block diagram of one example of the activity within at least one processor core counted by two counters to determine the potential sensitivity of a processor core to frequency changes based on the amount of pipelined activity occurring during off-core memory accesses.

In one example, FIG. 5 illustrates logical components for implementing the hardware description language illustrated in FIG. 4. Those of ordinary skill in the art will appreciate that in other examples, other combinations of logical components may be implemented to calculate the values set in not-finish counter 210 and not-busy counter 214.

In the example, not-finish counter 210 includes an accumulator 514 that counts each time a signal 512 is asserted by a logical AND gate 510 and not-busy counter 214 includes an accumulator 546 that counts each time a signal 544 is asserted by a logical AND gate 542. In the example, effectively, not-finish counter 210 accumulates a count for each cycle when at least one thread is waiting on an off-core memory access and none of the execution units finishes an operation and not-busy counter 214 accumulates a count for each cycle during execution when at least one thread is waiting on an off-core memory access and none of the threads are busy, meaning that there is no work happening on at least one processor core. In the example, firmware 550 may periodically read accumulator 514 and accumulator 546. In one example, firmware 550 may read accumulator 514 and accumulator 546 at the end of an interval as specified by a user or as specified by a fixed period of time. In one example, firmware 550 may read additional values providing information about run-time conditions, when reading accumulator 514 and accumulator 546, where the additional values may include, but are not limited to, the frequency at which a processor was run, error signals, and other information. In one example, DVFS controller 110 may implement firmware 550 or may receive values collected by firmware 550, for performance controller 116 to evaluate frequency sensitivity, determine whether adjustments to the frequency or power supply are indicated, and, if indicated, adjust the operational frequency of one or more of cores 102.

In one example, for accumulator 514 of not-finish counter 210 to count when at least one thread is waiting on an off-core memory access and none of the execution units finishes an operation, logical AND gate 510 receives inputs from a logical NOR gate 506 and a logical OR gate 524. In the example, finish signals 504 of all execution pipelines 502 are input to logical NOR gate 506. In the example, a finish signal of an execution pipeline is asserted one cycle after an execution pipeline completes execution of an instruction. In the example, a signal 508 output from logical NOR gate 506 is asserted when none of the execution pipelines has asserted a finish signal during a particular cycle. In the example, L3 miss signals 522 for all execution threads are input to logical OR gate 524. In the example, an L3 miss signal is asserted when any execution thread within a pipeline receives a miss from a memory access request to L3 cache, and therefore is waiting for an off-core memory access request. In the example, a signal 526 output from logical OR gate 524 is asserted when any thread within an execution pipeline is waiting on an off-core memory access and with L3 miss signal set. Signal 510 output from logical AND gate 510 is asserted when none of the pipelines has finished an operation during a particular cycle, indicating a first metric of idleness, and at least one thread is waiting on an off-core memory access.

In one example, for counter 546 to count when at least one thread is waiting on an off-core memory access and none of the execution units is busy, logical AND gate 542 receives inputs from logical OR gate 524 and from logical NOR gate 538. In the example, the execution pipelines of a processor core may include single cycle execution units and multiple cycle execution units. In one example, finish signals 534 of all single cycle units 530 are input to logical NOR gate 538. In the example, a finish signal of an execution pipeline is asserted one cycle after an execution pipeline completes execution of an instruction. In the example, if one of finish signals 534 is on, the finish signal indicates that the single cycle unit is busy and is finishing. In the example, the busy signals, from multiple cycle units 532 are input to logical NOR gate 538. In the example, the busy signals from multiple cycle units 532 may be asserted during any cycle in which an operation is in progress. In the example, signal 540 output from logical AND gate 542 is asserted when all of the pipelines are not busy, either because for the single cycle units there are no finishes or for the multiple cycle units they are not busy, as delayed by one cycle. Signal 544 output from logical AND gate 542 is asserted when all of the pipelines are not busy, indicating a second metric of idleness, and at least one thread is waiting on an off-core memory access.

Figure 6:
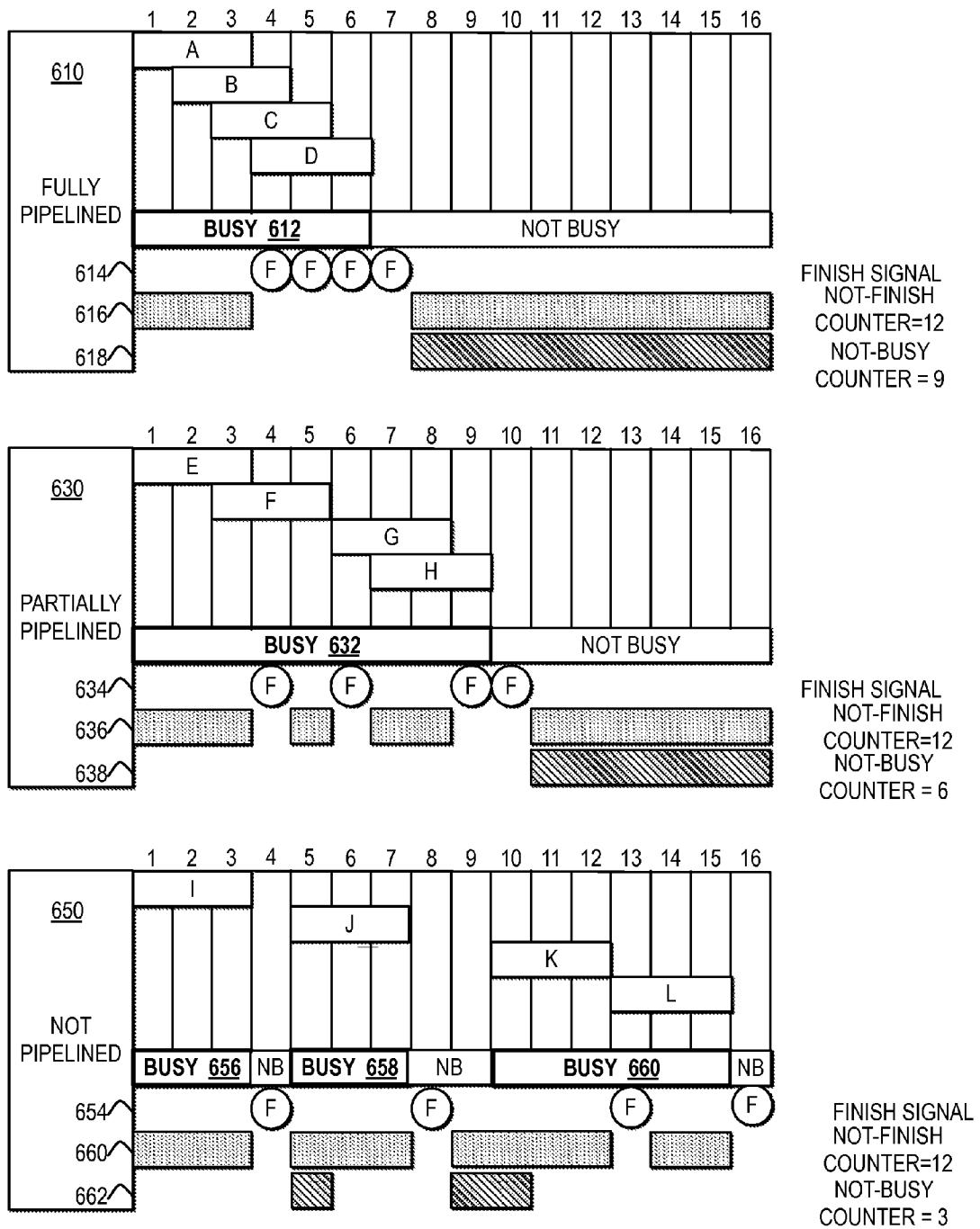
FIG. 6 is a block diagram illustrating one example of the execution timeline for multi-cycle operations reflecting the differences in the number of not-finish counter cycles to not-busy counter cycles during off-core memory accesses, dependent upon the amount of pipelining performed.

FIG. 6 illustrates a block diagram of the execution timeline for multi-cycle operations reflecting the differences in the number of not-finish counter cycles to not-busy counter cycles during off-core memory accesses, dependent upon the amount of pipelining performed.

In the examples illustrated in FIG. 6, during each of the cycles illustrates, it is assumed that at least one off-core memory access by at least one thread is pending while a pipelined processor core is executing multi-cycle operations. While one thread is waiting on an off-core memory access, another thread may send operations through one or more execution units. In one example, while an off-core memory access is pending for a thread of a processor core, no execution unit is performing any computation for the operation triggering the off-core memory access; once the result of the data fetch from off-core memory is returned, then an execution unit will operate on the fetched data.

In the examples illustrated in FIG. 6, the pipelined processor core executing multi-cycle operations is enabled to start a new operation each cycle, but during execution may or may not start a new operation each cycle, depending on operation dependencies and other factors. In the example illustrated, each operation takes three cycles to complete. In one example, as illustrated in FIG. 6, inside the execution unit of a processor core, operations progress through each of three stages, one per cycle, with one instruction, at most, in a stage at a time. In one example, as illustrated in FIG. 6, the instructions for each operation maintain their original ordering, and always take three cycles to complete execution. In other examples, a pipelined execution unit may be enabled to start additional or alternate numbers of new instructions each cycle and each operation may take additional or alternate numbers of cycles to complete. In addition, a pipelined execution unit may be enabled to execute different types of instructions, where some instructions only require a single cycle to execute and other instructions require multiple cycles to execute. As described herein, an operation may refer to the use of an execution unit to perform the necessary computation or processing required for an instruction. As described herein, an instruction may refer to a particular instruction and may also refer to the operation portion of the instruction.

In the examples illustrated at reference numeral 610, reference numeral 630, and reference numeral 650, each example shows a comparison of the differences in the number of not-finish counter cycles to not-busy counter cycles for different types of pipelined activity. In the example, a busy signal is set on for each cycle in which an instruction of an operation is in progress, independent of the number of instructions in progress during a cycle. If a same number of multi-cycle operations are executed, the number of busy signals reflects the extent of the overlap of executing operations, with more overlap of operations resulting in fewer busy cycles and less overlap of operations resulting in more busy cycles.

In addition, in the examples illustrated at reference numeral 610, reference numeral 630, and reference numeral 650, a finish signal is set on in a cycle following execution of each operation. In each of the examples illustrated, four instructions are executed in each example, resulting in the finish signal being turned on four times over each interval of 16 cycles illustrated.

In one example, when there is more overlapping possible from pipelined activity for multi-cycle operations, slowing down the frequency may not impact performance as measured by pipeline throughput because the same number of operations may still complete in a similar amount of time by availing of available pipelining capability. In another example, when there is less pipelining in a processor core, which may provide an indicator of a greater dependence between instructions, slowing down the core frequency may have a direct impact on performance, unless the processor core is waiting for off-core memory accesses and idle, or with no instructions finishing. In the example where the processor core is waiting for off-core memory accesses and also idle, slowing down the frequency may not impact performance.

In the example, not-finish counter 210 tracks the number of cycles in which the processor is not finishing an operation, while at least one off-core memory access is pending. In the example, for the multi-cycle operations illustrated, not-busy counter 214 tracks the number of cycles in which the busy signal, delayed by one cycle, is not on, while at least one off-core memory access is pending.

In a first pipelined operation example, illustrated at reference numeral 610, the operations are fully pipelined because the operations execute in consecutive pipeline cycles, with a new instruction of an operation starting execution each consecutive cycle for four cycles and an instruction of an operation finishing execution each consecutive cycle for four cycles. In the example, an instruction A starts in a first cycle. Instruction B starts, consecutively, in a second cycle, while instruction A is in progress, and not finished. Instruction C starts, consecutively, in a third cycle, while instruction A and instruction B are in progress, with instruction A finishing. Instruction D starts, consecutively, in the fourth cycle while instruction B and instruction C are in progress, with instruction B finishing. Instruction C and instruction D are in progress in a fifth cycle, with instruction C finishing. Instruction D is in progress in a sixth cycle, with instruction D finishing. In the example, six cycles transpire during the execution of instruction A, instruction B, instruction C and instruction D. In the example, while at least one execution unit is busy, a busy signal 612 is on. In the example, busy signal 612 is on for the six cycles required for instruction A, instruction B, instruction C, and instruction D to complete. In the example, in a cycle when an execution unit finishes an operation, a finish signal is turned on. In one example, as illustrated at reference numeral 614, a finish signal is turned on at the completion of the four cycles during which instruction A, instruction B, instruction C, and instruction D are completed, illustrated as the fourth, fifth, sixth, and seventh cycles.

In the example illustrated at reference numeral 610, as illustrated at reference numeral 616, not-finish counter 210 is incremented during each cycle in which a finish signal is not on. In the example, during an interval of 16 cycles, the finish signal is on for four cycles, and not-finish counter 210 counts 12 cycles during which a finish signal is not on. In the example, as illustrated at reference numeral 618, not-busy counter 214 is incremented during each cycle in which busy signal 612 is not on, delayed by one cycle, indicating that no operations are executing in the pipeline. In the example, busy signal 612 is on for the six first cycles of the 16 cycle interval. Not-busy counter 214 starts counting cycles where busy signal 612 is off, delayed by one cycle, in the eighth cycle of the 16 cycle interval, counting 9 cycles total. In the example, the not-finish counter value of "12" represents the upper limit on the cycles during which the frequency may be reduced without impacting performance because not-finish counter value indicates an idleness metric of the number of cycles in which no finishes, and thus no work, was detected while an off-core memory access is pending. In the example, the not-busy counter value of "9" represents the lower limit on the cycles during which the frequency may be reduced without impacting performance because the not-busy counter represents the number of cycles during which no operations are progressing through the execution units.

In a second pipelined operation example, illustrated at reference numeral 630, the operations are only partially pipelined because there is overlap in the execution of operations, but there is not a new instruction for an operation starting execution consecutively during each cycle. In the example, an instruction E starts in a first cycle. Only instruction E is in progress in a second cycle, and not finishing. Instruction F starts in a third cycle, while instruction E is in progress and finishing. Only instruction F is in progress in a fourth and fifth cycle, and finishes in the fifth cycle. Instruction G starts in a sixth cycle. Instruction H starts in a seventh cycle, as instructions G is in progress, and not finished. Instruction G and H are in progress in an eighth cycle, and instruction G finishes. Instruction H is in progress in a ninth cycle and finishes. In the example, nine cycles transpire during the execution of instruction E, instruction F, instruction G and instruction H. In the example, as long as one execution unit is busy, busy signal 632 is on. In the example, busy signal 632 is on for the nine cycles required for instruction E, instruction F, instruction G, and instruction H to complete. In the example, as illustrated at reference numeral 634, a finish signal is turned on at the completion of the four cycles during which instruction E, instruction F, instruction G, and instruction H are completed, illustrated as the fourth, eighth, ninth, and tenth cycles.

In the example illustrated at reference numeral 630, as illustrated at reference numeral 636, not-finish counter 210 is incremented during each cycle in which a finish signal is not on. In the example, during an interval of 16 cycles, the finish signal is on for four cycles, and not-finish counter 210 counts 12 cycles during which a finish signal is not on. In the example, as illustrated at reference numeral 638, not-busy counter 214 is incremented during each cycle in which busy signal 612 is not on, delayed by one cycle. In the example, busy signal 632 is on for the first nine cycles of the 16 cycle interval. Not-busy counter 214 starts counting cycles where busy signal 632 is off, delayed by one cycle, in the eleventh cycle of the 16 cycle interval, counting 6 cycles total. In the example, the not-finish counter value of "12" represents the upper limit on the cycles during which the frequency may be reduced without impacting performance because not-finish counter value indicates an idleness metric of the number of cycles in which no finishes, and thus no work, was detected while an off-core memory access is pending. In the example, the not-busy counter value of "6" represents the lower limit on the cycles during which the frequency may be reduced without impacting performance because the not-busy counter represents the number of cycles during which no operations are progressing through the execution units.

In a third pipelined operation example, illustrated at reference numeral 650, the operations are not pipelined because there is no overlap in the execution of the instructions. In the example, an instruction I starts in a first cycle and progresses through a second cycle and a third cycle at, before finishing. No instruction executes during a fourth cycle. Instruction J starts during a fifth cycle and progresses through a sixth cycle and a seventh cycle, before finishing. No instruction executes during an eighth cycle or a ninth cycle. Instruction K starts during a tenth cycle and progresses through an eleventh cycle and twelfth cycle, before finishing. Instruction L starts during the thirteenth cycle and progresses through a fourteenth and fifteenth cycle, before finishing. In the example, 16 cycles transpire during the execution of instruction I, instruction J, instruction K and instruction L. In the example, the busy signal is on, for three cycles at a time, for a total of 12 cycles, as illustrated at busy signal 656 during instruction I, busy signal 658 during instruction J, busy signal 660 during instruction K and instruction L, to complete. In the example, as illustrated at reference numeral 654, a finish signal is turned on at the completion of each of the four cycles during which instruction I, instruction J, instruction K, and instruction L are completed, illustrated as the fourth, eighth, thirteenth and sixteenth cycles.

In the example illustrated at reference numeral 650, as illustrated at reference numeral 660, not-finish counter 210 is incremented during each cycle in which a finish signal is not on. In the example, during an interval of 16 cycles, the finish signal is on for four cycles, and not-finish counter 210 counts 12 cycles during which a finish signal is not on. In the example, as illustrated at reference numeral 662, not-busy counter 214 is incremented during each cycle in which busy signals 656, 658, and 660 are not on, delayed by one cycle. In the example, busy signal 656 is on for the first three cycles, busy signal 658 is on for the fifth, sixth, and seventh cycles, and busy signal 660 is on for the tenth through fifteenth cycles. Not-busy counter 214 starts counting cycles where busy signal 632 is off, delayed by one cycle, in the fifth cycle, ninth cycle, and tenth cycle, counting 3 cycles total. In the example, the not-finish counter value of "12" represents the upper limit on the cycles during which the frequency may be reduced without impacting performance because not-finish counter value indicates an idleness metric of the number of cycles in which no finishes, and thus no work, was detected while an off-core memory access is pending. In the example, the not-busy counter value of "3" represents the lower limit on the cycles during which the frequency may be reduced without impacting performance because the not-busy counter represents the number of cycles during which no operations are progressing through the execution units.

As illustrated in the examples at reference numeral 610, reference numeral 630 and reference numeral 650, whether execution of four instructions is fully pipelined, partially pipelined, or not pipelined, when instructions require multiple cycles for execution, the four cycles during which the finish signal is turned on, is less than the number of cycles during which the processor is busy, therefore the finish signal alone is not a complete indicator of the performance sensitivity to frequency changes within a processor core. As illustrated in the example, more overlapping of instructions during execution may yield fewer cycles when a busy signal is on, and the smaller the differences between the number of cycles when finish signals are detected and the number of cycles when busy signals are detected; less overlapping of instructions during execution may yield more cycles when a busy signal is on and the larger the differences between the number of cycles when finish signals are detected and the number of cycles when busy signals are detected.

While in the examples illustrated, only four instructions are counted during each interval, in practice, millions of instructions across millions of cycles may be counted during each interval. As the number of cycles counted during an interval increases, the difference between the value in the not-finish counter and the not-busy counter for a single interval may or may not provide a direct indicator of the sensitivity of performance in a core to frequency change. If different workloads are run from one interval to another interval, the differences between not-finish counter vales and not-busy counter values across intervals may be influenced by the extent of multi-cycle execution unit usage in addition to the pipeline overlap in execution unit usage. In contrast, if a same workload is run multiple times during different intervals, the not-finish counter value and not-busy counter value from each interval can be compared to the not-finish counter value and not-busy counter value from another interval to determine any differences in the extent of pipelining from one interval to another interval. By running a same workload multiple times during different intervals, but changing the frequency during the different intervals, the impact of the frequency change on the extent of pipelining may be determined from the differences between the counter values as accumulated during the different intervals. In one example where a same workload is run on a core over multiple intervals, with a reduced frequency in one interval, and there is not a difference in idleness as indicated from the not-busy counter values for the intervals, a larger difference between the not-finish counter value and the not-busy counter value correlates with a smaller potential for frequency scaling without performance impact. In one example, idleness as indicated from the not-busy counter values for the intervals may be measured using a ratio of not-busy cycles, as counted in the not-busy counters, to total cycles within each interval.

For example, in the examples illustrated in FIG. 6, if each of the workloads illustrated at reference numeral 610, reference numeral 630, and reference numeral 650 were run at a first frequency during a first interval and then run at a second, slower frequency during a second interval, performance controller 116 may compare the results of the not-busy counter tracked for each workload during the first interval and the second interval to determine the difference between the not-busy counter values calculated for each set of workloads in each interval. The example illustrated at reference numeral 610 yields counter values accumulated for an execution of instructions that is fully pipelined of not-finish counter "12" and not-busy counter "9". In the example illustrated at reference numeral 610, it is likely that the frequency could be reduced and that because the instructions are fully pipelined, the instructions would complete work in a similar amount of time, without performance degradation. In contrast, the example illustrated at reference numeral 630 yields counter values accumulated for an execution of instructions that is only partially pipelined of not-finish counter "12" and not-busy counter "6", where the difference between the not-finish counter and not-busy counter value in reference numeral 630, of "6", is greater than the difference between the not-finish counter and not-busy counter value in reference numeral 610, of "3", reflecting that the extent of pipelining in reference numeral 630 is less than the extent of pipelining in reference numeral 610. In the example illustrated at reference numeral 630, the lower bound for the number of cycles that can be reduced without performance degradation is less than the number of cycles that can be reduced without performance degradation for the fully pipelined example in reference numeral 610. In addition, in contrast, the example illustrated at reference numeral 650 yields counter values accumulated for an execution of instructions that is not pipelined of not-finish counter "12" and not-busy counter "3", where the different between the not-finish counter and not-busy counter value in reference numeral 650 of "9" is greater than the differences between the counter values in reference numeral 630 and reference numeral 610, reflecting the extent of pipelining in reference numeral 650 is even less than the extent of pipelining in reference numeral 630. In the example illustrated at reference numeral 650, it is likely that a reduction in frequency would not impact the extent of pipelining because the lack of pipelining is likely caused by the scheduling of dependent instructions. In the example illustrated at reference numeral 650, where the extent of pipelining is minimal, and does not change with a minimal frequency change, the larger difference between the not-finish counter and not-busy counter of "9" in the example at reference numeral 650 indicates a smaller potential for further frequency scaling without degrading performance.

Figure 7:
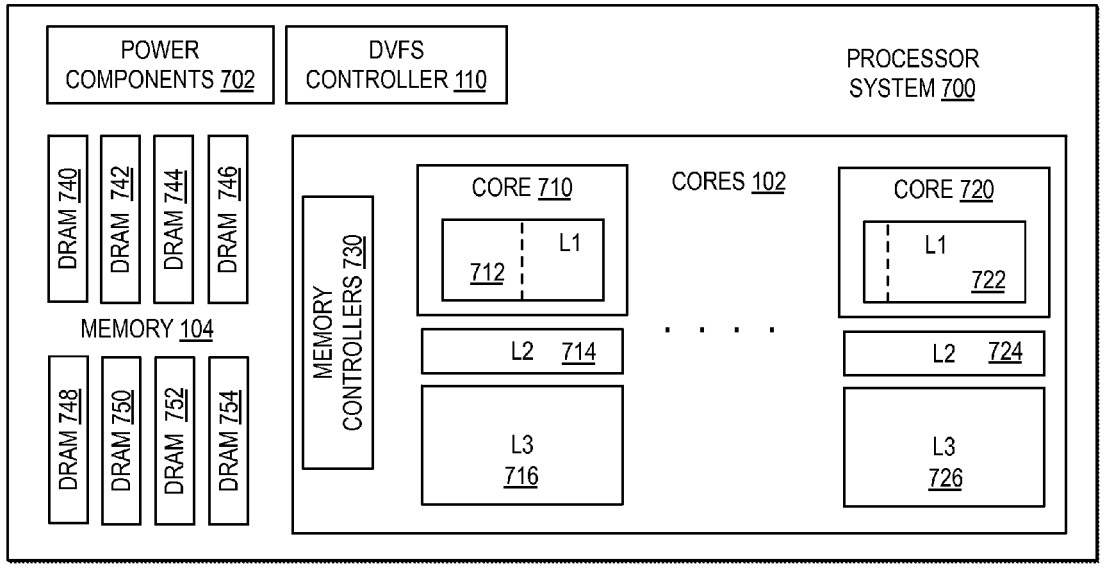
FIG. 7 is a block diagram illustrating one example of a multiple core processor system including multiple cores that may access off-core memory within the processor system.

FIG. 7 illustrates a block diagram of one example of a multiple core processor system including multiple cores that may access off-core memory within the processor system.

In one example, a processor system 700 includes cores 102, which include multiple processor cores 710 and 720, each with multiple levels of cache. In one example, processor core 710 includes a first level of cache L1 712, a next level of cache L2 714, and a third level of cache L3 716. In one example, processor core 720 includes a first level of cache L1 722, a next level of cache L2 724, and a third level of cache L3 726. Those of ordinary skill in the art will appreciate that cores 102 may include additional or alternate processor cores and additional or alternate levels of cache.

Memory controllers 730 are distributed among cores 102 for managing memory requests by cores 102 to memory 104, which is also referred to as off-core memory. Memory controllers 730 may include a single memory controller for all core processors within cores 102 or may include a distribution of controllers specific to each processor core and a controller that manages accesses to memory 104 by all the processor cores. In the example, memory 104 may include multiple dynamic random-access memory (DRAM) modules, such as DRAM 740, DRAM 742, DRAM 744, DRAM 746, DRAM 748, DRAM 750, DRAM 752, and DRAM 754. Examples of DRAM modules may include, but are not limited to Single In-line Pin Package (SIPP), Single In-Line Memory Module (SIMM), and Dual In-line Memory Module (DIMM). In addition, memory 104 may implement other types of memory including, but not limited to, solid-state drive storage (SSD).

In the example, power components 702 may include one or more components for controlling one or more aspects of the power usage of processor system 700, as directed by DVFS controller 110 or external inputs. In the example, DVFS controller 110 may include frequency sensitivity counters 112 that track real-time indicators of frequency sensitivity of core 710 and core 720, including counting cycles in which a thread of one or more of core 710 or core 720 is waiting on an off-core memory access to memory 104 and is idle, and may include performance controller 116 to evaluate the values in frequency sensitivity counters 112 and adjust the operating frequency of one or more of core 710 and core 720. In one example, multiple instances of frequency sensitivity counters 112 may be implemented, where each instance is specified to count the usage for a particular core from among cores 102. In one example, the instances of frequency sensitivity counters 112 may be distributed off-core as illustrated in the example, or may be distributed on-core with cores 102.

Those of ordinary skill in the art will appreciate that the hardware depicted in FIG. 7 may vary. Furthermore, those of ordinary skill in the art will appreciate that the depicted example is not meant to imply architectural limitations with respect to the present invention.

Figure 8:
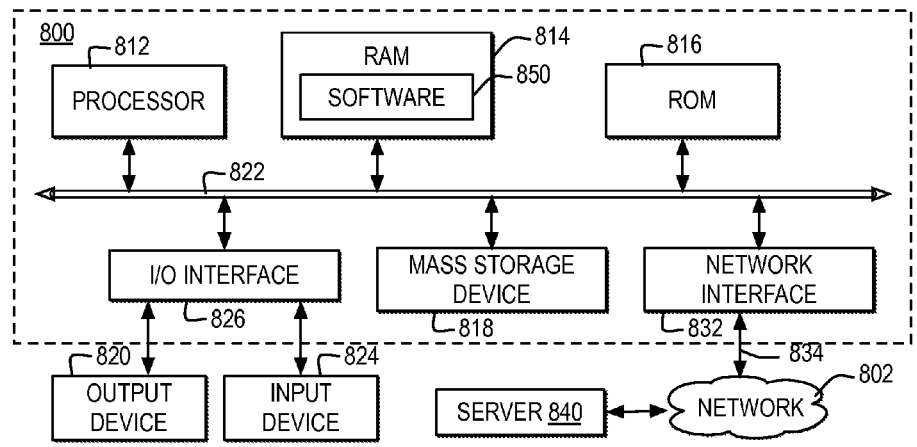
FIG. 8 is a block diagram illustrating one example of a computer system in which one embodiment of the invention may be implemented.

FIG. 8 illustrates a block diagram of one example of a computer system in which one embodiment of the invention may be implemented. The present invention may be performed in a variety of systems and combinations of systems, made up of functional components, such as the functional components described with reference to a computer system 800 and may be communicatively connected to a network, such as network 802.

Computer system 800 includes a bus 822 or other communication device for communicating information within computer system 800, and at least one hardware processing device, such as processor 812, coupled to bus 822 for processing information. Bus 822 preferably includes low-latency and higher latency paths that are connected by bridges and adapters and controlled within computer system 800 by multiple bus controllers. When implemented as a server or node, computer system 800 may include multiple processors designed to improve network servicing power. Where multiple processors share bus 822, additional controllers (not depicted) for managing bus access and locks may be implemented.

Processor 812 may be at least one general-purpose processor such as IBM® PowerPC® processor that, during normal operation, processes data under the control of software 850, which may include at least one of application software, an operating system, middleware, and other code and computer executable programs accessible from a dynamic storage device such as random access memory (RAM) 814, a static storage device such as Read Only Memory (ROM) 816, a data storage device, such as mass storage device 818, or other data storage medium. Software 850 may include, but is not limited to, code, applications, protocols, interfaces, and processes for controlling one or more systems within a network including, but not limited to, an adapter, a switch, a server, a cluster system, and a grid environment. In one example, processor system 100 and processor system 700 may be implemented within computer system 800, where processor 812 may represent cores 102, RAM 814 may represent memory 104, and the elements of DVFS controller 110 may be implemented within processor 812 and RAM 814. In another example, processor 812 may implement processor system 100 or processor system 700.

Computer system 800 may communicate with a remote computer, such as server 840, or a remote client. In one example, server 840 may be connected to computer system 800 through any type of network, such as network 802, through a communication interface, such as network interface 832, or over a network link that may be connected, for example, to network 802.

In the example, multiple systems within a network environment may be communicatively connected via network 802, which is the medium used to provide communications links between various devices and computer systems communicatively connected. Network 802 may include permanent connections such as wire or fiber optics cables and temporary connections made through telephone connections and wireless transmission connections, for example, and may include routers, switches, gateways and other hardware to enable a communication channel between the systems connected via network 802. Network 802 may represent one or more of packet-switching based networks, telephony based networks, broadcast television networks, local area and wire area networks, public networks, and restricted networks.

Network 802 and the systems communicatively connected to computer 800 via network 802 may implement one or more layers of one or more types of network protocol stacks which may include one or more of a physical layer, a link layer, a network layer, a transport layer, a presentation layer, and an application layer. For example, network 802 may implement one or more of the Transmission Control Protocol/Internet Protocol (TCP/IP) protocol stack or an Open Systems Interconnection (OSI) protocol stack. In addition, for example, network 802 may represent the worldwide collection of networks and gateways that use the TCP/IP suite of protocols to communicate with one another. Network 802 may implement a secure HTTP protocol layer or other security protocol for securing communications between systems.

In the example, network interface 832 includes an adapter 834 for connecting computer system 800 to network 802 through a link and for communicatively connecting computer system 800 to server 840 or other computing systems via network 802. Although not depicted, network interface 832 may include additional software, such as device drivers, additional hardware and other controllers that enable communication. When implemented as a server, computer system 800 may include multiple communication interfaces accessible via multiple peripheral component interconnect (PCI) bus bridges connected to an input/output controller, for example. In this manner, computer system 800 allows connections to multiple clients via multiple separate ports and each port may also support multiple connections to multiple clients.

Figure 9:
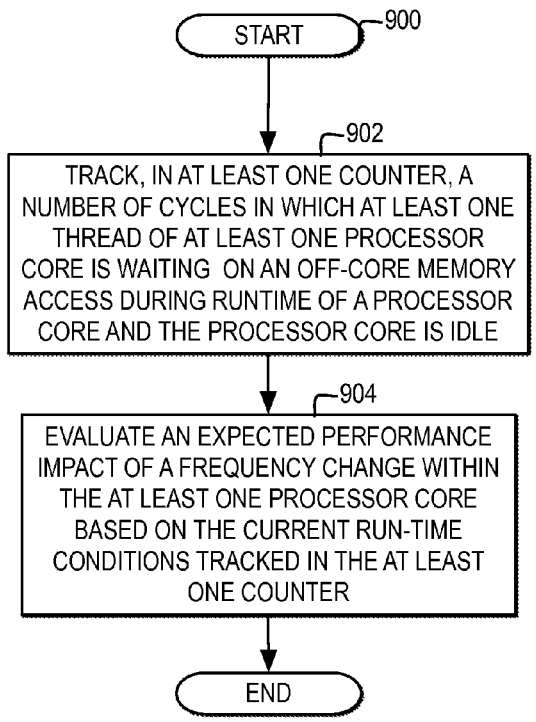
FIG. 9 is a high level logic flowchart illustrating a process and program for tracking pipelined activity during off-core memory accesses.
Figure 10:
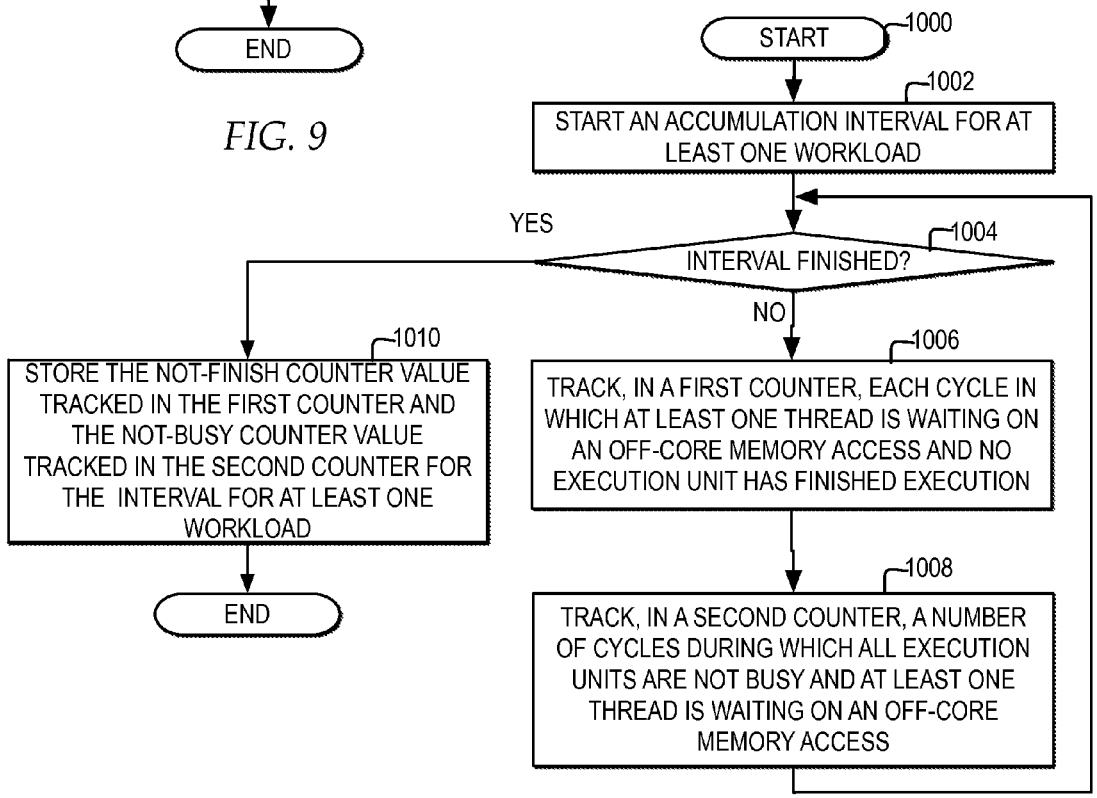
FIG. 10 is a high level logic flowchart illustrating a process and program for tracking idleness metrics during off-core memory accesses.

In one embodiment, the operations performed by processor 812 may control the operations of flowchart of FIGS. 9 and 10 and other operations described herein. Operations performed by processor 812 may be requested by software 850 or other code or the steps of one embodiment of the invention might be performed by specific hardware components that contain hardwired logic for performing the steps, or by any combination of programmed computer components and custom hardware components. In one embodiment, one or more components of computer system 800, or other components, which may be integrated into one or more components of computer system 800, may contain hardwired logic for performing the operations of flowcharts FIGS. 9 and 10.

In addition, computer system 800 may include multiple peripheral components that facilitate input and output. These peripheral components are connected to multiple controllers, adapters, and expansion slots, such as input/output (I/O) interface 826, coupled to one of the multiple levels of bus 822. For example, input device 824 may include, for example, a microphone, a video capture device, an image scanning system, a keyboard, a mouse, or other input peripheral device, communicatively enabled on bus 822 via I/O interface 826 controlling inputs. In addition, for example, output device 820 communicatively enabled on bus 822 via I/O interface 826 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 8, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 8 may vary. Furthermore, those of ordinary skill in the art will appreciate that the depicted example is not meant to imply architectural limitations with respect to the present invention.

FIG. 9 illustrates a high level logic flowchart of a process and program for tracking pipelined activity during off-core memory accesses. In the example, the process and program starts at block 900 and thereafter proceeds to block 902. Block 902 illustrates tracking, in at least one counter, a number of cycles in which at least one thread of at least one processor core is waiting on an off-core memory access during runtime of the at least one processor core and the processor core is idle. Next, block 904 illustrates evaluating an expected performance impact of a frequency change within at least one processor core based on the current run-time conditions tracked in the at least one counter, and the process ends.

FIG. 10 illustrates a high level logic flowchart of a process and program for tracking idleness metrics during off-core memory accesses. In the example, the process and program starts at block 1000 and thereafter proceeds to block 1002. Block 1002 illustrates starting an accumulation interval. Next, block 1004 illustrates a determination whether the interval is completed.

At block 1004, if the interval is completed, then the process passes to block 1010. Block 1010 illustrates storing the not-finish counter value tracked in the first counter and the not-busy counter value tracked in the second counter for the interval for the at least one workload, and the process ends. In addition, at block 1010, one or more indicators of the frequency at which the interval was run may be stored, where the indicators may include, but are not limited to, a number of cycles for an interval and a frequency at which a processor core is run during an interval. In another example, the indicator of the frequency, may be stored as a ratio of the not-busy counter value to the number of cycles in an interval, where the ratio may also provide an indicator of idleness for an interval.

At block 1004, if the interval is not yet completed, then the process passes to block 1006. Block 1006 illustrates tracking, in a first counter, each cycle in which an execution thread is waiting on an off-core memory access and no execution units have finished execution. Next, block 1008 illustrates tracking, in a second counter, a number of cycles in which all the execution units indicate they are not busy, while at least one thread is waiting on an off-core memory access, and the process returns to block 1004.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for tracking pipelined activity during off-core memory accesses, comprising:
   tracking, in at least one counter, a number of cycles in which at least one execution unit of at least one processor core is idle and at least one thread of the at least one processor core is waiting on at least one off-core memory access during run-time of the at least one processor core during an interval comprising a plurality of cycles by tracking the number of cycles on at least one multi-cycle execution unit from among the at least one execution unit that requires more than one cycle to complete execution of at least one operation; and
   evaluating an expected performance impact of a frequency change within the at least one processor core based on the current run-time conditions tracked in the at least one counter during the interval.

2. The method according to claim 1, wherein tracking, in at least one counter, a number of cycles in which at least one execution unit of at least one processor core is idle and at least one thread of the at least one processor core is waiting on at least one off-core memory access during run-time of the at least one processor core during an interval comprising a plurality of cycles further comprises:
   tracking in a first counter of the at least one counter, each cycle of the plurality of cycles during which none of the at least one execution unit is finishing execution and the at least one thread of the at least one processor core is waiting on at least one off-core memory access; and
   tracking in a second counter of the at least one counter, each cycle of the plurality of cycles during which none of the at least one execution unit is busy and the at least one thread of the at least one processor core is waiting on at least one off-core memory access.

3. The method according to claim 2, further comprising:
   evaluating an amount of pipelining overlap within the at least one processor core from the difference between a first value in the first counter and a second value in the second counter.

4. The method according to claim 2, further comprising:
   determining the number of cycles during which the at least one execution unit in the processor core is busy, but none of the plurality of execution units are finishing execution, from a difference between a first value in the first counter and a second value in the second counter.

5. The method according to claim 2, further comprising:
   evaluating the value in the first counter as a measure for an upper bound on a first number of cycles that can be reduced by a frequency change comprising a slower frequency that will not impact performance as measured by a pipeline throughput of the at least one processor core; and
   evaluating the value in the second counter as a measure for a lower bound on a second number of cycles that can be reduced by a frequency change comprising a slower frequency that will not impact the performance as measured by the pipeline throughput of the at least one processor core.

6. The method according to claim 2, further comprising:
   tracking, during a first interval running at a first frequency, in the second counter of the at least one counter, each cycle of the plurality of cycles of a workload during which none of the at least one execution unit is busy and the at least one thread of the at least one processor core is waiting on at least one off-core memory access, as a first counter value;
   storing the first counter value;
   tracking, during a second interval running at a second frequency, in the second counter of the at least one counter, each cycle of the plurality of cycles of the workload during which none of the at least one execution unit is busy and the at least one thread of the at least one processor core is waiting on at least one off-core memory access, as a second counter value, wherein the second frequency is slower than the first frequency;
   calculating a separate ratio for each interval, wherein the separate ratio comprises a value in the second counter for the interval over a frequency for the interval; and
   determining a change in frequency sensitivity from the first frequency to the second frequency from a difference between a first ratio calculated for the first frequency and a second ratio calculated for the second frequency, wherein the change in frequency sensitivity provides an indicator of the expected performance impact of an additional frequency change within the at least one processor core.

7. The method according to claim 6, further comprising:
in response to determining that there is not a difference between first ratio and the second ratio, evaluating the lack of difference as an indicator of the extent of dependency among a plurality of execution units of at least one processor core to execute the workload, wherein each of the plurality of execution units is a multi-cycle execution units that requires more than one cycle to complete execution of at least one operation.

8. The method according to claim 6, further comprising:
in response to determining that there is not a difference between the first ratio and the second ratio, determining an indicator of a change in frequency sensitivity of the workload based on an additional difference between the first counter and the second counter.

9. The method according to claim 2, further comprising:
tracking, during a first interval running at a first frequency, in the first counter of the at least one counter, each cycle of the plurality of cycles during which none of the at least one execution unit is finishing execution and the at least one thread of the at least one processor core is waiting on at least one off-core memory access, as a first counter value;
storing the first counter value;
tracking, during a second interval running at a second frequency, in the first counter of the at least one counter, each cycle of the plurality of cycles during which none of the at least one execution unit is finishing execution and the at least one thread of the at least one processor core is waiting on at least one off-core memory access, as a second counter value, wherein the second frequency is slower than the first frequency;
calculating a separate ratio for each interval, wherein the separate ratio comprises a value in the first counter for the interval over a frequency for the interval; and
determining a change in frequency sensitivity from the first frequency to the second frequency from a difference between a first ratio calculated for the first frequency and a second ratio calculated for the second frequency, wherein the change in frequency sensitivity provides an indicator of the expected performance impact of an additional frequency change within the at least one processor core.

10. The method according to claim 1, wherein tracking, in at least one counter, a number of cycles in which at least one execution unit of at least one processor core is idle and at least one thread of the at least one processor core is waiting on at least one off-core memory access during run-time of the at least one processor core during an interval comprising a plurality of cycles:
tracking the number of cycles on at least one multi-cycle execution unit from among the at least one execution unit that requires more than one cycle to complete execution of at least one operation and on at least one single cycle execution unit from among the at least one execution unit that requires one cycle to complete execution of the at least one operation.

11. The method according to claim 1, wherein tracking, in at least one counter, a number of cycles in which at least one execution unit of at least one processor core are idle and at least one thread of the at least one processor core is waiting on at least one off-core memory access during run-time of the at least one processor core during an interval comprising a plurality of cycles further comprises:
detecting at least one thread of the at least one processor core is waiting on the at least one off-core memory access by detecting a cache miss signal set for the at least one thread.

12. The method according to claim 1, wherein tracking, in at least one counter, a number of cycles in which at least one execution unit of at least one processor core are idle and at least one thread of the at least one processor core is waiting on at least one off-core memory access during run-time of the at least one processor core during an interval comprising a plurality of cycles further comprises:
detecting at least one thread of the at least one processor core operating in a first clock domain is waiting on a memory access request to the at least one off-core memory operating in a second clock domain.

* * * * *